(12) United States Patent
Chen et al.

(10) Patent No.: US 8,394,352 B2
(45) Date of Patent: Mar. 12, 2013

(54) POROUS METAL OXIDE PARTICLES AND THEIR METHODS OF SYNTHESIS

(75) Inventors: Fanglin Chen, Irmo, SC (US); Qiang Liu, Columbia, SC (US)

(73) Assignee: University of South Carolina, Columbia, SC (US)

( * ) Notice: Subject to any disclaimer, the term of this patent is extended or adjusted under 35 U.S.C. 154(b) by 316 days.

(21) Appl. No.: 12/634,092

(22) Filed: Dec. 9, 2009

(65) Prior Publication Data

US 2010/0143721 A1 Jun. 10, 2010

Related U.S. Application Data

(60) Provisional application No. 61/201,253, filed on Dec. 9, 2008.

(51) Int. Cl.
*C01B 13/14* (2006.01)
*C01B 13/32* (2006.01)

(52) U.S. Cl. ...... 423/265; 423/140; 423/143; 423/592.1

(58) Field of Classification Search ........................ None
See application file for complete search history.

(56) References Cited

U.S. PATENT DOCUMENTS

| | | | | |
|---|---|---|---|---|
| 4,133,854 A * | 1/1979 | Hendricks | ........................ | 264/10 |
| 4,548,767 A * | 10/1985 | Hendricks | ........................ | 264/7 |
| 5,024,695 A * | 6/1991 | Ashdown et al. | ................ | 75/338 |
| 5,958,367 A * | 9/1999 | Ying et al. | .................... | 423/701 |
| 6,054,111 A * | 4/2000 | Antonietti et al. | ............ | 423/702 |
| 6,617,364 B2 * | 9/2003 | Soane et al. | .................... | 521/56 |
| 6,752,979 B1 * | 6/2004 | Talbot et al. | ................ | 423/592.1 |
| 7,115,305 B2 * | 10/2006 | Bronikowski et al. | ...... | 427/249.1 |
| 7,560,285 B2 * | 7/2009 | Sun | ................................ | 436/164 |
| 7,560,570 B2 * | 7/2009 | Boger | .......................... | 548/200 |
| 7,569,254 B2 * | 8/2009 | Rao et al. | ..................... | 427/385.5 |
| 7,723,394 B2 * | 5/2010 | Klimov et al. | ................... | 516/98 |
| 7,727,909 B2 * | 6/2010 | Alarco et al. | .................. | 438/785 |
| 7,919,068 B2 * | 4/2011 | Edwards et al. | ............ | 423/593.1 |
| 2006/0052241 A1* | 3/2006 | Airiau et al. | ................... | 502/304 |
| 2007/0031322 A1* | 2/2007 | Edwards et al. | ............ | 423/593.1 |
| 2011/0230337 A1* | 9/2011 | Ji et al. | ........................... | 502/304 |

OTHER PUBLICATIONS

Li et al., Self-assembled colloidal crystalline arrays using hollow colloidal spheres, Synthetic Metals 149 (2005) 225-230.*
Jang et al, Fabrication of hollow metal microcapsules with mesoporous shell structure; Application as efficiency catalysts recyclable by simple magnetic separation, Bull. Korean Chem. Soc. (2011), vol. 32, No. 9, 3274-3280.*

* cited by examiner

*Primary Examiner* — Hoa (Holly) Le
(74) *Attorney, Agent, or Firm* — Dority & Manning, P.A.

(57) ABSTRACT

Methods are generally disclosed for synthesis of porous particles from a solution formed from a leaving agent, a surfactant, and a soluble metal salt in a solvent. The surfactant congregates to form a nanoparticle core such that the metal salt forms about the nanoparticle core to form a plurality of nanoparticles. The solution is heated such that the leaving agent forms gas bubbles in the solution, and the plurality of nanoparticles congregate about the gas bubbles to form a porous particle. The porous particles are also generally disclosed and can include a particle shell formed about a core to define an average diameter from about 0.5 μm to about 50 μm. The particle shell can be formed from a plurality of nanoparticles having an average diameter of from about 1 nm to about 50 nm and defined by a metal salt formed about a surfactant core.

16 Claims, 3 Drawing Sheets

POROUS METAL OXIDE PARTICLES AND THEIR METHODS OF SYNTHESIS

PRIORITY INFORMATION

The present application claims priority to U.S. Provisional Patent Applicant Ser. No. 61/201,253 filed on Dec. 9, 2008 titled "Method to Synthesize Porous Metal Oxide", the disclosure of which is incorporated by reference herein.

GOVERNMENT SUPPORT CLAUSE

This invention was made with government support under DE-FG36-08GO88116 awarded by the US Dept. of Energy. Therefore, the government has certain rights in the invention.

BACKGROUND

Hollow structures have received great attention due to their wide applications in many fields such as catalysis, encapsulation, delivery and controlled release of drugs, chemical/biological separation and sensing. The most-applied method for the synthesis of hollow structure is by far the templating approach, including two main pathways. One is the templating against colloidal particles; the basis of this process is coating the template particles in solution by direct surface reactions that utilize specific functional groups on the cores to create core/shell composites, followed by removal of the cores by calcination or solvent extraction. The other is the layer-by-layer self-assembly technique, in which polyelectrolyte and micrometer sized inorganic nanoparticles are usually used as sacrificial cores.

Although tremendous success has been made in synthesizing hollow structures by the templating approach, the limitations of such method are also obvious: "hard templates" which require complicated preparation sequences are always needed, thus significantly increasing the cost for producing hollow structures at large scale.

SUMMARY

Objects and advantages of the invention will be set forth in part in the following description, or may be obvious from the description, or may be learned through practice of the invention.

Methods are generally disclosed for synthesis of porous particles. According to one embodiment, a solution is formed from a leaving agent, a surfactant, and a soluble metal salt in a solvent. The surfactant defines a hydrophobic tail and a hydrophilic head and congregates to form a nanoparticle core. The metal salt forms about the nanoparticle core to form a plurality of nanoparticles having an average diameter of from about 1 nm to about 50 nm. The solution is heated such that the leaving agent forms gas bubbles in the solution, and the plurality of nanoparticles congregate about the gas bubbles to form a porous particle having an average diameter from about 0.5 μm to about 50 μm. In one particular embodiment, heating the solution includes evaporating the solvent form the solution (e.g., at room temperature), then increasing the temperature of the solution at a rate slower than about 10° C. per minute; and finally, heating the solution at a heating temperature for a time sufficient to allow the gas bubbles to form in the solution.

Porous particles are also generally disclosed. The porous particles can include a particle shell formed about a core to define an average diameter from about 0.5 μm to about 50 μm. The particle shell can be formed from a plurality of nanoparticles having an average diameter of from about 1 nm to about 50 nm and defined by a metal salt formed about a surfactant core.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

Figure 1:
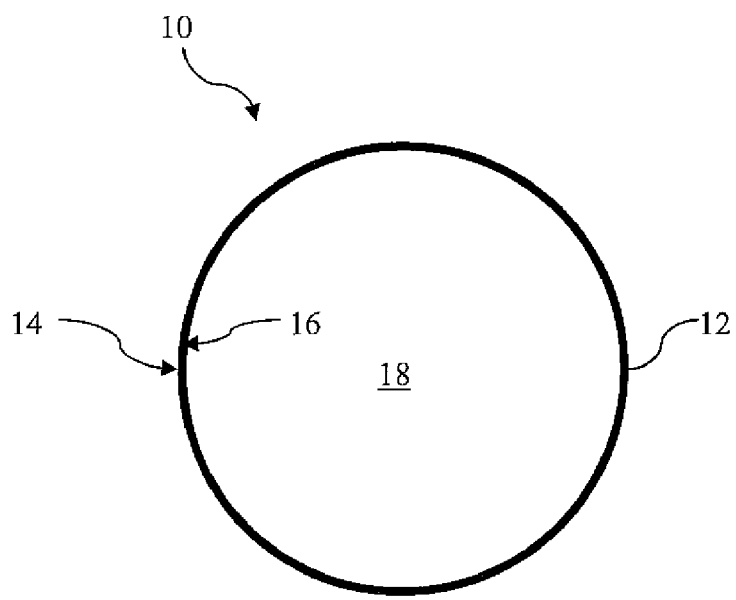
FIG. 1 shows a cross-section of an exemplary particle formed according to one embodiment of the present invention.

Repeat use of reference characters in the present specification and drawings is intended to represent the same or analogous features or elements of the present invention.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

As used herein, the prefix "nano" refers to the nanometer scale (i.e., from about 1 nm to about 999 nm). For example, particles having an average diameter on nanometer scale (i.e., from about 1 nm to about 999 nm) are referred to as "nanoparticles". Particles having a size of greater than 1,000 nm (i.e., 1 μm) are generally referred to as "microparticles", since the micrometer scale generally involves those particles having an average diameter of greater than 1 μm.

Generally speaking, the present disclosure is directed to hollow particles having a porous shell (e.g., a metal containing shell, a carbon shell, etc,) and the method for forming them. The method relies on a two step process: (1) evaporation induced self assembly (EISA) and (2) a self-rising approach to synthesize hierarchically porous materials. Accordingly, the methods have wide applicability and versatility while remaining relatively easy to perform at a low cost. The methods can be, for instance, used to synthesize hollow as well as hierarchically porous single or mixed metal oxides and metals. The methods can also be environmentally benign, as they can utilize metal nitrates as metal precursors, ethanol and water as solvents, and urea as leaving agents. The particles formed can be aggregated to form hollow or hierarchically porous structures with high Brunauer, Emmett, and Teller ("BET") surface areas.

FIG. 1 shows an exemplary porous particle 10 defined by a shell 12 about a core 18. The porous particle 10 can have a diameter on the large nanometer (nm) to micron (μm) scale, when measured from the outer surface 14 of the shell 12. For instance, the average diameter of the porous particle can be greater than about 0.5 μm, such as from about 0.75 μm to about 50 μm. In particular embodiments, the average diameter of the porous particle can be from about 0.9 μm to about 10 μm, such as from about 1 μm to about 5 μm. In one exemplary embodiment, for example, the porous particle can have an average diameter of about 1 μm to about 3 μm.

In one particular embodiment, the core 18 can be a hollow core. It is to be understood that the term "hollow core" refers to a substantially non-solid core that may include a liquid and/or gaseous material. Thus, the term "hollow core" does not necessarily mean a core devoid of matter (i.e., a vacuum). As such, a number of materials can be inserted into the hollow core 18, before or after formation, allowing the particle 10 to be used as a delivery material. Materials with hollow structures may find applications in many fields: photo-catalysis, heterogeneous catalysis, gas sensors, drug delivery, adsorption, etc.

Figure 2:
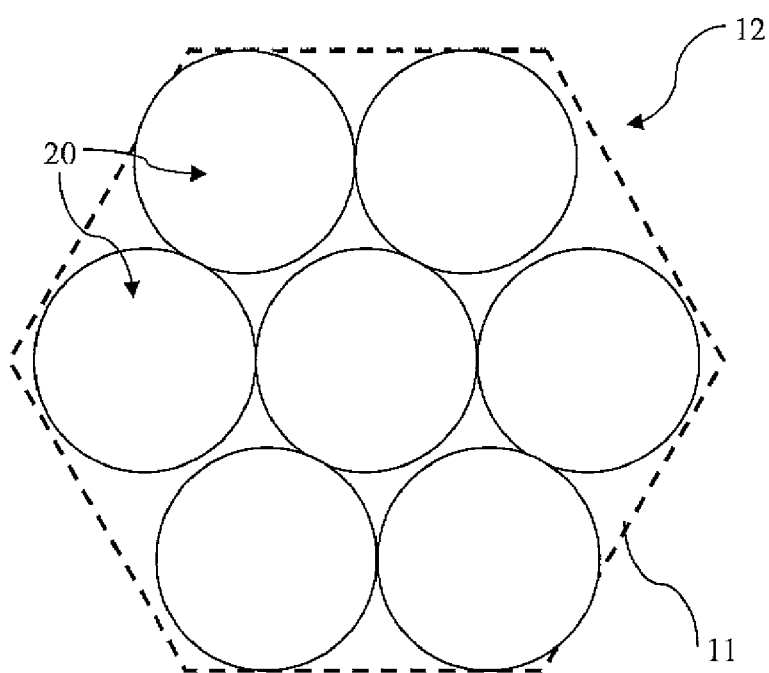
FIG. 2 show an enlarged view of the surface of the shell of the exemplary particle of FIG. 1.
Figure 3:
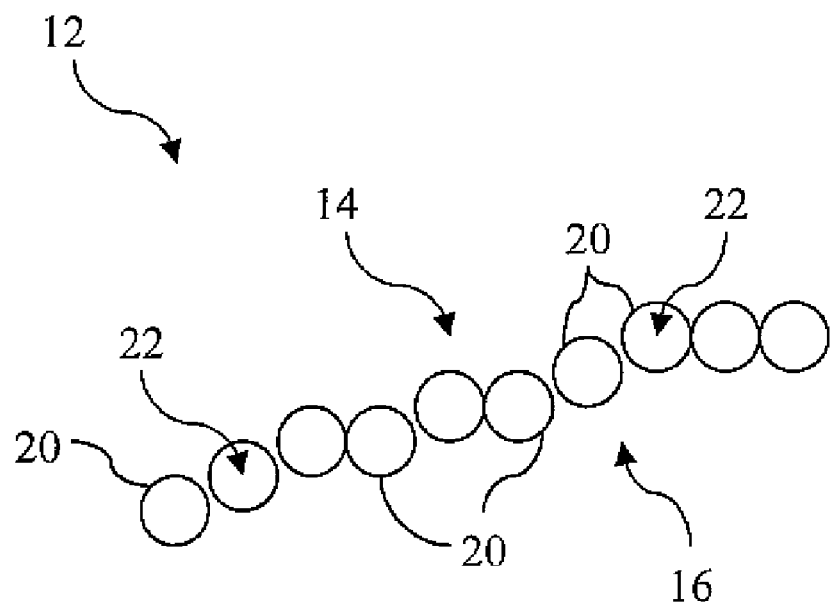
FIG. 3 shows an enlarged view of a cross-section of the shell of the exemplary hollow particle of FIG. 1 formed from a plurality of nanoparticles.

According to one embodiment, the porous shell 12 of the particle 10 can be defined and formed by a plurality of nanoparticles 20 having an average diameter from about 1 nm to about 50 nm, such as from about 5 nm to about 25 nm. In particular embodiments, the shell 24 forming nanoparticles 20 can have a diameter of from about 7.5 nm to about 15, such as about 10 nm. FIG. 3 shows a single layer of nanoparticles 20 forming the porous shell 12 of the particle 10 such that the thickness of the shell 12 is substantially a single nanoparticle 20. When formed from a single layer, the nanoparticles 20 can self-assemble into the hexagon-like configuration 11 shown in FIG. 2 to form a porous shell 12 resembling a honey-comb shape. Thus, the porous particle can define a hierarchically porous shell. However, it is to be understood that the porous shell 12 can include a different thickness of nanoparticles 20 in other embodiments (e.g., a substantially double layer, a substantially triple layer, etc.).

The plurality of nanoparticles 20 can be formed from a solution of a leaving agent, a surfactant, and a soluble metal salt in a solvent. The solution may have to be agitated (e.g., stirred, shaken, etc) to ensure that the materials go into solution. Alternatively, or additionally, the solution can be ultrasonicated to form a homogeneous solution. The solvent can be an aqueous solution (i.e., contains water) or can be an alcohol-based solution. Particular solvents useful for the presently disclosed methods include, but are not limited to, water, methanol, ethanol, propanol, iso-propanol, dimethyl sulfoxide (DMSO, glycol, acetone, toluene, benzene, etc., and other polar solvents. Combinations of miscible solvents can also be utilized to form a solvent system.

In this EISA method, the self-assembly process is triggered as the solvent evaporates when the concentration of the surfactant in the solution begins to exceed the critical micelle concentration. Upon high temperature calcination, the template is removed and the ordered mesoporous materials can be obtained. In addition, the precursor after solvent evaporation is viscoelastic and sticky due to the existence of a large amount of surfactant. Such physical properties help in the subsequent heating process, because material can be easily changed to any form and shape when the leavening agent inside the solution as it decomposes to release gases. If the metal precursors are too rigid before calcination, the macropores would easily crack or fracture and the macroporous structure will be destroyed.

Figure 4:
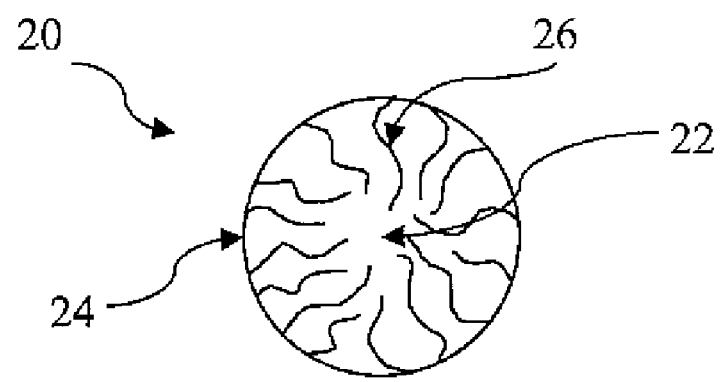
FIG. 4 shows an enlarged view of an exemplary nanoparticle shown in FIG. 2 forming the shell of the exemplary hollow particle shown in FIG. 1.
Figure 5:
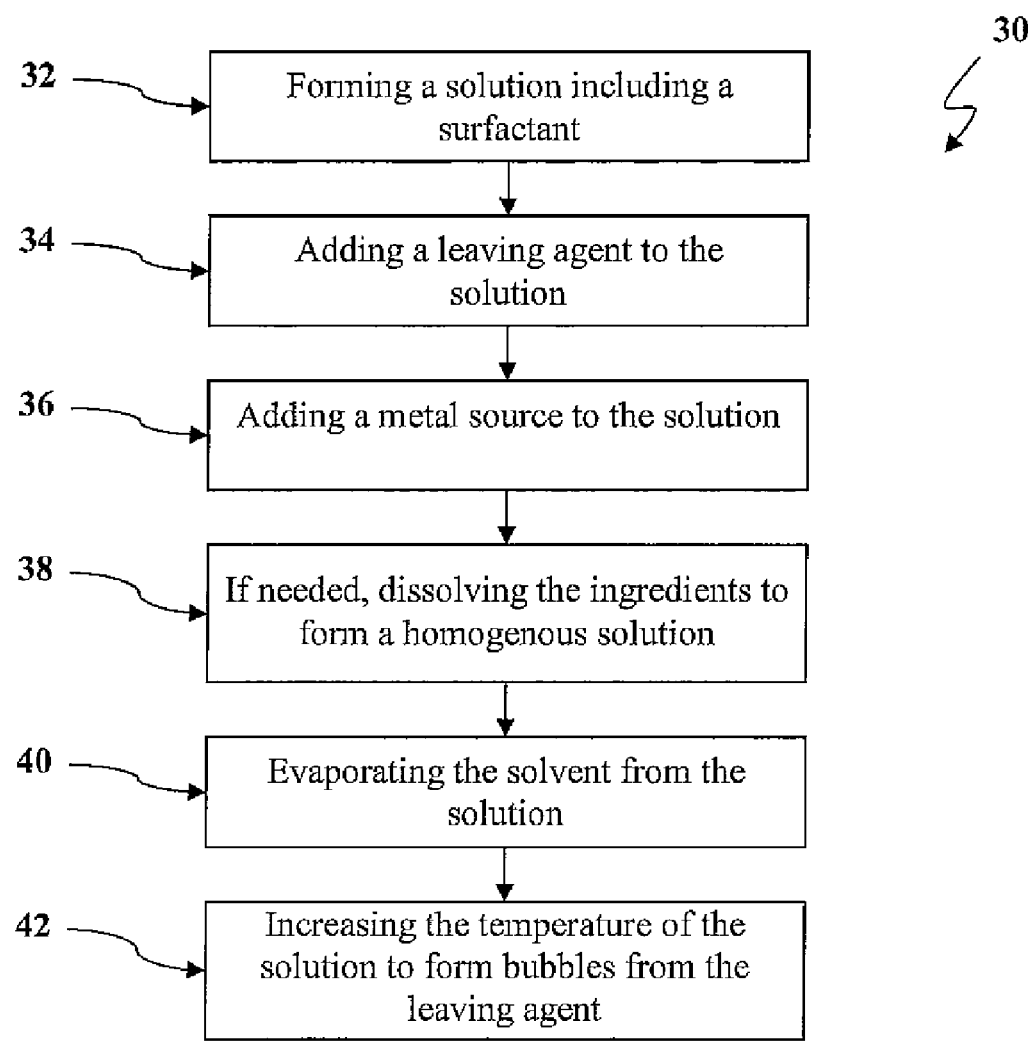
FIG. 5 is an exemplary flow diagram of a method of one embodiment of the present invention.

For instance, the surfactant defines a hydrophobic tail and a hydrophilic head and assembles to form a nanoparticle aggregates (e.g., vesicles and micelles). In one particular embodiment, such as shown in FIG. 4, the aggregates are formed as micelles such that the surfactants' hydrophobic tails 26 form a core and the hydrophilic heads form an outer shell 24 that maintains favorable contact with water. With the evaporation of the solvent, the concentration of nonvolatile species progressively increases and surfactant micelles form and self assemble into ordered structure while the hydrophilic head groups of the surface interact with the inorganic precursor and urea. Any number of soluble surfactants can be utilized in accordance with the present invention. In one embodiment, the surfactant can include a block co-polymer, such as a poly(ethylene glycol)-block-poly(propylene glycol)-block-poly(ethylene glycol) co-polymer. For example, one particularly suitable block co-polymer, having a formula of $HO(CH_2CH_2O)_{20}(CH_2CH(CH_3)O)_{70}(CH_2CH_2O)_{20}H$ and an average molecular weight of about 5800 Da weight, is sold by Aldrich as poly(ethylene glycol)-block-polypropylene glycol)-block-poly(ethylene glycol) under the name Pluronic P123 (BASF Corporation, New Jersey). Other suitable surfactants include, but are not limited to, polyethylene glycol (PEG), polyvinyl alcohol (PVA), polyvinyl butyral (PVB), the difunctional block copolymer surfactant terminating in primary hydroxyl groups sold under the name Pluronic F127 (BASF Corporation, New Jersey), etc.

The metal salt forms about the surfactant core 22 to form the plurality of nanoparticles 20. Thus, nanoparticles 20 having a surfactant core 22 surrounded by a nanoparticle shell 24 are formed while the nanoparticles are still in solution. In one particular embodiment, the material of the nanoparticle shell 24 forming nanoparticles 20 can be a metal salt. Any soluble metal salt can be utilized to form the nanoparticle, including but not limited to, metal oxides, metal nitrates, metal acetates, metallo-organic compounds, etc., and combinations thereof. The metal salt can include a metal ion formed from cobalt, cerium, strontium, iron, samaria, lanthanum, and combinations thereof. Of course, any transition metal having a suitable soluble metal salt precursor can be used. Particularly suitable metal salts include cobalt (II) nitrate (e.g., $Co(NO_3)_2, 6H_2O$), cerium (II) nitrate (e.g., $Ce(NO_3)_2, 6H_2O$), strontium nitrate (e.g., $Sr(NO_3)_2$), iron nitrate (e.g., $Fe(NO_3)_2$), and combinations thereof (e.g., LSCF having a formula $La_{0.5}Sr_{0.5}CO_{0.5}Fe_{0.5}O_3$). The metal salts can be doped in certain embodiments with minor amounts of a dopant, such as samaria doped ceria (e.g., $Sm_{0.2}Ce_{0.8}O_{1.9}$).

The metal ion of the metal salt is positively charged and is generally attracted to the hydrophilic head (i.e., ionic head) of the surfactant. Thus, the metal salt aggregates to define the nanoparticle shell 24 about the surfactant core 22 forming the plurality of nanoparticles 20 having a surfactant core 22 that includes the hydrophobic tails 26 of the surfactant molecules.

Another suitable porous shell material (e.g., a metal shell, a carbon shell, etc.) may be used in addition to or in the alternative to the metal oxide particles. For example, metal shells can be obtained by direct reduction of the oxides in reducing atmospheres. Alternatively, carbon shells can be prepared using sucrose as precursor.

The solution containing the plurality of nanoparticles 20 can then be heated such that the leaving agent forms gas bubbles in the solution. The plurality of nanoparticles 20 can congregate about the gas bubbles to form the porous shell 12 of the particles 10 with the gas bubbles defining the core 18 (e.g., the hollow core 18) where the inner surface 16 of the porous shell 12 contacts the gaseous bubbles and the outer surface 14 of the porous shell 12 contacts the remaining solution.

In one particular embodiment, the solvent can be allowed to evaporate from the solution (e.g., at a room temperature from about 20° C. to about 25° C.) for about 20 to about 50 hours (e.g., for about 24 to about 48 hours) to ensure that the surfactant aggregates into the surfactant core.

The solution can be heated slowly to from room temperature (e.g., from about 20° C. to about 25° C.) to a heating temperature greater than the boiling point of the leaving agent. Thus, the leaving agent can turn to a gas in the solution, creating gas bubbles. Increasing the temperature of the solution at a relatively slow rate (e.g., slower than about 10° C. per minute) can help the bubbles form non-violently in the solution and can allow sufficient time for the plurality of nanoparticles 20 to aggregate about the gas bubbles to form the shell 12 of the particles 10. In particular embodiments, the temperature of the solution can be increased at a rate from about 0.5° C. per minute to about 5° C. per minute, such as from about 0.75° C. per minute to about 2° C. per minute (e.g., a rate of about 1° C. per minute).

The solution can be subjected to the heating temperature for a time sufficient to allow the gas bubbles to form in the solution (e.g., from about 1 hour to about 10 hours). Depending on the particular leaving agent in the solution, the heating temperature can be above 250° C., such as from about 350° C. to about 550° C.

The leaving agent can be selected from any suitable compound that is soluble in the solution and can form gas bubbles upon heating (i.e., a macropore generator through decomposition or boiling to release gases at elevated temperatures). One particularly suitable leaving agent is urea ($(NH_2)_2CO$), which can begin to form gas bubbles at temperatures above about 150° C. when in solution (e.g., an aqueous solution). Specifically, urea can decompose to produce only the gases $NH_3$ and $CO_2$, and consequently avoids impurities and contamination to the particle 10. Other leaving agents can include, but are not limited to, ammonia, baking soda ($NaHCO_3$), $NH_4NO_3$, $NH_4Cl$, $(NH_4)_2CO_3$, etc., and combinations thereof.

EXAMPLE 1

The detailed experimental process was conducted as follows, using cobalt oxide as a model:

0.6 g of a triblock copolymer, with a formula of $HO(CH_2CH_2O)_{20}(CH_2CH(CH_3)O)_{70}(CH_2CH_2O)_{20}H$ and an average molecular weight of about 5800 Da weight, sold by Aldrich as poly(ethylene glycol)-block-poly(propylene glycol)-block-poly(ethylene glycol) under the name Pluronic P123 (EO20PO70EO20, Aldrich), was dissolved in 13 mL of ethanol and 2 mL water inside a 50 mL beaker. Then, 1 g urea and 2 mmol Co(NO3)2.6H2O (or 1 mmol Ce(NO3)2.6H2O and 1 mmol Sr(NO3)2, Alfa Aesar) were added. After ultrasonicating at room temperature (RT) for 5 minutes to make them dissolved, the homogeneous sol was let dry naturally at RT for solvent evaporation. After one or two days aging, calcination was carried out by slowly increasing temperature from room temperature to 120° C. (at a heating rate of 1° C. per min) for 3 h and then heating at 500° C. for another 5 h in air.

The as-synthesized cobalt oxide showed high crystallization via SEM images, and also indicated large areas of sphere forming a 5 μm thick layer. The layer was composed by spheres with diameters around 1 μm. TEM analysis showed porous hollow sphere with very thin shells, some of which exhibited intact or broken sphere morphology.

High magnitude TEM exhibited very small particles around 10 nm that self assembled into the shell structure, worm type pores with size about 10 nm were randomly distributed.

This approach can be used not only to prepare hollow metal oxides, but also to synthesize other category of hollow materials such as hollow carbon which can be prepared using sucrose as precursor and hollow metal which may be obtained by direct reduction of the oxides in reducing atmospheres. Materials with hollow structures may find applications in many fields: (1) Photo-catalysis. Both nickel oxide and zinc oxide with hollow structures show significantly higher activities than the traditional bulk materials. Such improvement can be attributed to the several outstanding features of the thin shell hollow structures with high surface volume ratio, and consequently effective electron hole separation of the Schottky barriers; (2) Heterogeneous catalysis. Hollow Pd spheres show good catalytic activities in Suzuki cross coupling reactions and can be reused many times without loss of catalytic activity. (3) Gas sensors. WO3 hollow spheres gas sensors have good sensitivity to ethanol and acetone at room temperature. SnO2 hollow spheres show "quick-recovery" property when using them in ethanol sensor. (4) Drug delivery. Hollow silica and titania microspheres with no apparent toxicity to cells are worth using as drug-delivery systems. Stimuli-responsive controlled drug-release system has been successfully obtained using hollow silica microspheres. (5) Adsorption. Hollow silica nano-spheres containing Rh, Ir or Ru metal particles show high adsorption on hydrogen, and the amount of hydrogen adsorbed over these hollow structure materials is two to three times more than that for the non-hollow materials.

EXAMPLE 2

$Fe_2O_3$, $Sm_{0.2}Ce_{0.8}O_{1.9}$, $LaFeO_3$, $LaCoO_3$, and $La_{0.5}Sr_{0.5}CO_{0.5}Fe_{0.5}O_3$ were successfully synthesized while $Fe_2O_3$ and $La_{0.5}Sr_{0.5}CO_{0.5}Fe_{0.5}O_3$ as examples for single and mixed metal oxides were studied in detail. $Sm_{0.2}Ce_{0.8}O_{1.9}$ has been applied as electrolyte for solid oxide fuel cells, showing good sinterability and high conductivity.

A. Preparation of Hierarchically Porous Metal Oxides

For the synthesis of single metal oxide, $Fe_2O_3$, 0.6 g Pluronic P123 ($M_{av}$=5800, $EO_{20}PO_{70}EO_{20}$, Aldrich) was dissolved in 13 mL ethanol and 2 mL water inside a 50 mL beaker. 1 g urea and 2 mmol Fe(NO3)3.9H2O were then added. To prepare $La_{0.5}Sr_{0.5}CO_{0.5}Fe_{0.5}O_3$ (LSCF), 0.5 mmol Co(NO3)2.6H2O, La(NO3)3.6H2O, Sr(NO3)2 and Fe(NO3)3.9H2O (Alfa Aesar) were added as metal precursor without changing other parameters.

To prepare samarium-doped ceria, $Sm_{0.2}Ce_{0.8}O_{1.9}$ (SDC), 0.4 mmol Sm(NO3)3.6H2O and 1.6 mmol Ce(NO3)3.6H2O were added as metal precursor. For comparison, SDC samples were also synthesized by a traditional polyvinyl alcohol (PVA) combustion method.

After ultrasonicating at room temperature (RT) for 15 minutes to dissolve the chemicals, the homogeneous sol was dried naturally at RT for solvent evaporation. After two days aging, calcination was carried out in air by slowly increasing temperature from RT to 120° C. (1° C. per min ramping rate). After holding at 120° C. for 3 h, the sample was then heated to 450° C. and then held at 450° C. for 5 h. To obtain LSCF single crystalline phase, the 450° C. calcined LSCF sample was further calcined at 900° C. for 2 h.

B. Characterization and Analyses

The powder X-ray diffraction (XRD) pattern was recorded on a D/MAX-3C X-ray diffractometer with graphite-monochromatized CuKα radiation ($\lambda$=1.5418 Å), employing a scanning rate of 5°/min in the 2θ range of 20 to 80°. The structure and morphology of the synthesized products were characterized by scanning electron microscopy (SEM, FEI Quanta and XL 30) equipped with an energy dispersive X-ray (EDX) analyzer and transmission electron microscopy (TEM, Hitachi H-800, 200 kV). The samples were also characterized by nitrogen adsorption/desorption at −196° C. by using a NOVA 2000 series volumetric adsorption system. Simultaneous thermal analysis (thermogravimetry-differential scanning calorimetry, TG-DSC) was performed on a NETZSCH STA 409.

AC impedance spectra of the sintered SDC pellets were conducted on a potentiostat/galvanostat with built-in impedance analyzer (Versa STAT 3-400, Princeton Applied Research) in the frequency range of 0.05 Hz to 100 kHz at 800° C. Both sides of the sintered SDC pellets were coated with silver paste and heat-treated at 800° C. for 30 min before testing. In all the measurements, Ag lead wires were used and the lead resistance was subtracted by measuring the impedance of a blank cell.

The XRD pattern of the as-synthesized iron oxide showed strong and sharp diffraction peaks in the XRD pattern indicating that the obtained product was well crystallized. All the diffraction peaks can be perfectly indexed as α-$Fe_2O_3$. The SEM image of $Fe_2O_3$ revealed a typical three dimensionally macroporous morphology with an average macrospore diameter around 2 μm. The 'honeycomb-like' macrostructure can be observed over a range of hundreds of micrometers. A low magnitude TEM confirmed that the macropores in these materials were highly interconnected. High magnitude TEM study on the macropores' walls clearly showed disordered mesoporous structures. These irregular mesopores were formed by $Fe_2O_3$ nanoparticles with diameter around 10 nm, which was further confirmed by the followed nitrogen adsorption/desorption analysis.

The nitrogen adsorption and desorption isotherms of the calcined $Fe_2O_3$ with honeycomb structure displayed a type IV isotherm with type H1 hysteresis loops in the relative pressure range of 0.75~0.98. The high relative pressure indicated large pore size in these samples. The pore size distribution was determined by the Barrett-Joyner-Halenda (BJH) method and showed a broad distribution in the range of 2-45 nm (inset of FIG. 2). The Brunauer-Emmett-Teller (BET) surface area and pore volume were 48 $m^2$/g and 0.12 $cm^3$/g, respectively. Such hierarchically porous structures are expected to have broad applications in catalysis and adsorption.

The interest in LSCF mixed metal oxides (MMOs) stems from its possible applications as cathode materials for intermediate temperature solid oxide fuel cells (IT-SOFCs), because LSCF possesses mixed ionic and electronic conduction with adequate oxide ion and electronic conductivities. Cathodes within the IT-SOFCs have stringent porous requirements to fulfill the function of facile mass transport and effective charge-transfer. Several researchers have attempted to tailor the microstructure to improve its porosity. However, due to the difficulty and high cost of obtaining metal alkoxide precursors and the high calcination temperature needed to form a single phase LSCF, there has been no report on the synthesis of macroporous LSCF.

The low and high magnitude SEM graphs of the as-synthesized LSCF calcined at 450° C. ($LSCF_{450}$) revealed a three dimensionally honeycomb like morphology, which was very similar to that of $Fe_2O_3$. Large fractions (over 90%) of the sample (shown in supporting information) had highly ordered porous structure in three dimensions over a range of hundreds of micrometers. However, XRD results indicate that the $LSCF_{450}$ was amorphous. In order to get well-crystallized LSCF, further higher temperature calcination was required. TG-DSC was performed on the $LSCF_{450}$ sample in order to obtain insight into the reaction process to form the perovskite phase. No further reaction occurred above 850° C., consistent with the XRD analysis. After calcination at 900° C. for 2 h, high crystalline perovskite $LSCF_{900}$ was obtained. One significant feature of this self-rising approach is that the high temperature calcination does not destroy the original macroporous structure. The low magnitude SEM of $LSCF_{900}$ exhibited the same ordered macroporous structure as that of $LSCF_{450}$. The larger and thicker channel walls in $LSCF_{450}$ most probably led to enhanced thermal stability of the 3D macrostructure in this work. High magnitude SEM and TEM of $LSCF_{900}$ showed randomly distributed pores with pore diameter around 150 nm in the macropore walls. Such porous structure is expected to provide facile gas transport pathways in the LSCF cathodes for IT-SOFCs. Another difference between $LSCF_{450}$ and $LSCF_{900}$ was the average size of the macropores. After measuring the adjacent 60 pores from the SEM images, apparent shrinkage of the LSCF macroporous structure could be seen after high temperature treatment. The average pore diameter of $LSCF_{450}$ was about 5 μm, which is twice as large as that of $LSCF_{900}$. This may be due to LSCF crystallite growth and the mesopores inside the macropore walls of $LSCF_{450}$ sintering at high temperature, resulting in the macroscopic volume decreasing.

See Chen, et al., "Self-rising approach to synthesize hierarchically porous metal oxides", Materials Research Bulletin 44 (2009) 2059-2061, which is incorporated by reference in its entirety.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A method for synthesis of a porous particle, the method comprising
    forming a solution from a leaving agent, a surfactant, a soluble metal salt, and a solvent, wherein the surfactant defines a surfactant molecule having a hydrophobic tail and a hydrophilic head;
    evaporating the solvent from the solution to cause a plurality of the surfactant molecules to congregate to form a nanoparticle core as the solvent evaporates from the solution, wherein the metal salt forms about the nanoparticle core to form a plurality of nanoparticles having an average diameter of from about 1 nm to about 50 nm; and
    heating the solution to cause the leaving agent to form gas bubbles in the solution, wherein the plurality of nanoparticles congregate about the gas bubbles to form a porous particle having an average diameter from about 0.5 μm to about 50 μm.

2. The method of claim 1, wherein the leaving agent comprises urea.

3. The method of claim 1, wherein the surfactant comprises a block copolymer.

4. The method of claim 3, wherein the block copolymer comprises poly(ethylene glycol)-block-poly(propylene glycol)-block-poly(ethylene glycol).

5. The method of claim 1, wherein the metal salt comprises a metal oxide.

6. The method of claim 1, wherein the metal salt comprises a metal nitrate.

7. The method of claim 1, wherein the metal salt comprises a metal acetate.

8. The method of claim 1, wherein the metal salt comprises a metal ion formed from cobalt, cerium, strontium, iron, samaria, lanthanum, or combinations thereof.

9. The method of claim 1, wherein the solvent is evaporated from the solution at a room temperature from about 20° C. to about 25° C.

10. The method of claim 1, wherein heating the solution to cause the leaving agent to form gas bubbles in the solution comprises:
    increasing the temperature of the solution at a rate slower than about 10° C. per minute.

11. The method of claim 10, wherein the temperature of the solution is increased at a rate from about 0.5° C. per minute to about 5° C. per minute.

12. The method of claim 10, wherein the temperature of the solution is increased at a rate from about 0.75° C. per minute to about 2° C. per minute.

13. The method of claim 10, wherein the heating temperature is from about 350° C. to about 550° C.

14. The method of claim 10, wherein the heating temperature is about 500° C.

15. The method of claim 1, wherein heating the solution to cause the leaving agent to form gas bubbles in the solution comprises:
    heating the solution at a heating temperature for a time sufficient to allow the gas bubbles to form in the solution, wherein the heating temperature is about 350° C. to about 550° C.

16. The method as in claim 15, wherein the solution is heated at the heating temperature for about 1 hour to about 10 hours.

* * * * *